United States Patent
Frost et al.

(10) Patent No.: US 12,528,968 B2
(45) Date of Patent: Jan. 20, 2026

(54) POLYFUNCTIONAL ACRYLATE MONOMERS

(71) Applicant: Solventum Intellectual Properties Company, Maplewood, MN (US)

(72) Inventors: Sven Frost, Essen (DE); Frans A. Audenaert, Kaprijke (BE); Inge Nuyts, Steendorp (BE); Pierre-Alexandre Bourgeois, Essen (DE); Maria De Bondt, Willebroek (BE)

(73) Assignee: THERMO FISHER BIOPROCESSING INC., Waltham, MA (US)

( * ) Notice: Subject to any disclaimer, the term of this patent is extended or adjusted under 35 U.S.C. 154(b) by 875 days.

(21) Appl. No.: 17/767,160

(22) PCT Filed: Nov. 4, 2020

(86) PCT No.: PCT/IB2020/060394
§ 371 (c)(1),
(2) Date: Apr. 7, 2022

(87) PCT Pub. No.: WO2021/090216
PCT Pub. Date: May 14, 2021

(65) Prior Publication Data
US 2022/0389267 A1    Dec. 8, 2022

(30) Foreign Application Priority Data
Nov. 8, 2019  (EP) .................................... 19208125

(51) Int. Cl.
*C08F 2/46* (2006.01)
*B05D 3/06* (2006.01)
*C08F 2/50* (2006.01)
*C08F 222/10* (2006.01)
*C08F 283/06* (2006.01)
*C08F 290/06* (2006.01)
*C08G 61/04* (2006.01)
*C08G 65/333* (2006.01)
*C09D 4/00* (2006.01)
*C09D 135/02* (2006.01)
*C09D 151/08* (2006.01)

(52) U.S. Cl.
CPC ............. *C09D 151/08* (2013.01); *B05D 3/06* (2013.01); *C08F 222/1063* (2020.02); *C08F 283/06* (2013.01); *C08F 290/062* (2013.01); *C08G 65/33303* (2013.01); *C09D 4/00* (2013.01); *C09D 135/02* (2013.01)

(58) Field of Classification Search
CPC ...... C09D 135/02; C09D 151/08; C09D 4/00; B05D 3/06; C08F 283/06; C08F 290/062; C08F 222/1063; C08F 222/1006; C08G 65/33303
USPC .................................. 522/103, 100, 1; 520/1
See application file for complete search history.

(56) References Cited

U.S. PATENT DOCUMENTS

| 8,426,490 B2* | 4/2013 | Bissinger | C07C 271/16 523/117 |
|---|---|---|---|
| 2022/0395783 A1* | 12/2022 | Frost | B01D 61/145 |
| 2024/0100486 A1* | 3/2024 | Frost | B01D 71/68 |
| 2024/0382905 A1* | 11/2024 | Bourgeois | B01D 71/261 |

FOREIGN PATENT DOCUMENTS

| CN | 102719143 A | 10/2012 |
|---|---|---|
| CN | 102732094 A | 10/2012 |
| CN | 104910680 A | 9/2015 |
| CN | 105315731 A | 2/2016 |
| CN | 105754087 A | 7/2016 |
| CN | 106867376 A | 6/2017 |
| EP | 3222682 A1 | 9/2017 |
| WO | 2003046038 A1 | 6/2003 |
| WO | 2012121822 A1 | 9/2012 |
| WO | 2016166397 A1 | 10/2016 |
| WO | 2017030754 A1 | 2/2017 |

OTHER PUBLICATIONS

Klee et al, Monomers for low shrinking composites, 2a synthesis of branched methacrylate and their application in dental composites, macromol. chem. phys. 200, 517-523, 1999 (Year: 1999).*

Klee et al, Monomers for low shrinking composites, Synthesis of branched methacrylates and their application in dental composites, 1999, Macromol. Chem. Phys., 200, No. 3, 517-523 (Year: 1999).*

Biswal et al, A single-step polymerization method for the poly(beta-amino ester) biodegradable hydrogels, Nov. 4, 2011, Polymer, 52, S985-S992 (Year: 2011).*

1507 Extended EP Search Report for E19208125.5, PCT/IB2020/060394, Jun. 2, 2020, 6 pages.

International Search report for PCT International Application No. PCT/IB2020/060394 mailed on Feb. 5, 2021, 5 pages.

Klee, "Monomers for low shrinking composites, 2a Synthesis of branched methacrylates and their application in dental composites", Macromolecular chemistry and physics, 1999, vol. 200, No. 3, pp. 517-523.

* cited by examiner

Primary Examiner — Jessica Whiteley
(74) Attorney, Agent, or Firm — HYLTON-RODIC LAW PLLC

(57) ABSTRACT

The present disclosure is related to a hydrophilic monomer, comprising (i) at least one amino moiety; (ii) at least one polyoxyalkylene unit; and (iii) at least one (meth)acrylate moiety.

15 Claims, No Drawings

POLYFUNCTIONAL ACRYLATE MONOMERS

CROSS REFERENCE TO RELATED APPLICATIONS

This application is a national stage filing under 35 U.S.C. 371 of PCT/IB2020/060394, filed Nov. 4, 2020, which claims the benefit of European Application No. 19208125.5, filed Nov. 8, 2019, the disclosure of which is incorporated by reference in its/their entirety herein.

FIELD

The present disclosure relates to hydrophilic monomers. In addition, the present disclosure relates to a process for producing such hydrophilic monomers by reacting polyoxyalkylamines with (meth)acrylate compounds. The present disclosure further relates to coatings obtained by such hydrophilic monomers and their use for filtration and coating substrates.

BACKGROUND

As commonly known, plastics are used for a vast number of products and materials for various applications. As such, a large number of different plastics are known, and further plastic materials are still being developed according to the intended use or application. As such, plastic materials may be designed with regard to their polarity, which then influences whether the material may be classified as being hydrophobic or hydrophilic. Many plastics are quite nonpolar in nature, which means that they are hydrophobic. For example, polycarbonate, polyvinylchloride (PVC), polymethylmethacrylate (PMMA), acrylonitrile-butadiene-styrene terpolymer (ABS), polyethylene (PE), polypropylene (PP) may be named.

Plastics are due to their ability to being easily formed in any shape often the material of choice for industrially produced products. However, for some applications, there is the desire or even need to make the surfaces of certain products more hydrophilic. For instance, an increased hydrophilicity may be necessary or at least desirable when printings or coatings are to be applied onto the surface, or when antistatic or anti-fogging properties are desired. Hydrophilicity may be imparted onto plastic surfaces by coating the surfaces with a hydrophilic material. Accordingly, the advantages associated with the use of plastics as material remain, while the surface is adapted to the envisaged purpose. Hydrophilicity can be imparted with thermally cured coatings e.g. based on hydrophilic polyurethanes or acrylate copolymers. Hydrophilic UV-cured coatings are also of particular importance as many plastics cannot withstand higher temperatures used for curing. UV-coatings also require much less energy and can be very efficiently used in a continuous operation with minimal investments.

For example, EP 1458778 A1 discloses aqueous urethane dispersions for paints and inkjet cartridges. WO 2017/030754 A1 describes a composition for the crosslinking of an amine with a vinyl compound of α,β-conjugated to an ester carbonyl group and subsequent polymerization of the vinyl compound, and processes corresponding to prepare coatings comprising these compositions.

While there are numerous examples of compounds, compositions and processes for increasing the hydrophilicity of plastics surfaces, there is still a need in industry and science for compounds which may increase the hydrophilicity of plastics surfaces, and which may be applied reliably and easily by established continuous operation methods in industry, and which furnish stable and at least mechanically resistant coatings.

SUMMARY

The present disclosure provides a hydrophilic monomer, comprising
(i) at least one amino moiety;
(ii) at least one polyoxyalkylene unit; and
(iii) at least one (meth)acrylate moiety.

The present disclosure further provides a process for producing a hydrophilic monomer, comprising reacting at least one polyoxyalkylamine with at least one (meth)acrylate compound.

Furthermore, the present disclosure relates to coatings obtained from the hydrophilic monomers as described herein, and certain uses of these hydrophilic monomers for coating substrates.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. It should be noted, however, that the use of "comprising" herein also encompasses the term of "consisting of", i.e. the use of "consisting of in the sense of" consisting only of is not excluded in the present disclosure per se.

Amounts of ingredients of a composition may be indicated by % by weight (or "% wt". or "wt.-%") unless specified otherwise. The amounts of all ingredients gives 100% wt unless specified otherwise. If the amounts of ingredients are identified by % mole the amount of all ingredients gives 100% mole unless specified otherwise.

Unless explicitly indicated, all preferred ranges and embodiments may be combined freely.

Parameters as described herein may be determined as described in detail in the experimental section.

The present disclosure provides a hydrophilic monomer, comprising
(i) at least one amino moiety;
(ii) at least one polyoxyalkylene unit; and
(iii) at least one (meth)acrylate moiety.

This combination of moieties, i.e. at least one amino moiety, at least one polyoxyalkylene unit and at least one (meth)acrylate moiety of the hydrophilic monomers as disclosed herein, allows for production of coatings on plastic substrates by established methods such curing by actinic irradiation. This combination of moieties also gives rise to desirable properties of coatings obtained from the hydrophilic monomers as described herein such as increased hydrophilicity, antistatic or potentially antibacterial properties and mechanical stability (e.g. shown by scratch tests). These properties may also be present in combination with a pH-triggered switching of properties, believed to be due to the presence of the at least one amino moiety.

Preferably, the at least one polyoxyalkylene unit is selected from polyethers. Polyethers exhibit good chemical stability for the purposes envisaged herein and do usually not exhibit significant environmental or health concerns. A preferred example for polyether units is the category of polyethyleneglycols (PEG).

The hydrophilic monomers according to the present disclosure comprise at least one amino moiety. This gives rise to a certain hydrophilicity of the monomer itself, but also to the coating obtained therefrom. With regard to the at least one amino moiety, it is preferred that it is at least one secondary amino moiety and/or at least one tertiary amino moiety. Secondary and tertiary amino moieties are both chemically stable enough for the purposes envisaged herein. They also exhibit a reduced nucleophilicity compared to primary amino moieties (due to steric reasons), and are only susceptible to some extent to differing pH-values when immersing the coating obtained from the monomers in aqueous solutions. Preferably, the hydrophilic monomer as described herein comprises at least one secondary amino moiety. In this regard, it is preferred that the hydrophilic monomer comprises one secondary amino moiety, two secondary amino moieties, three secondary amino moieties, or four secondary amino moieties. It is also preferred that the monomer comprises at least one tertiary amino moiety. Preferably, the monomer comprises one tertiary amino moiety, two amino moieties, three amino moieties, or four tertiary amino moieties.

The hydrophilic monomer according to the present disclosure comprises at least one (meth)acrylate moiety. This presence of at least one (meth)acrylate moiety has the advantage that the hydrophilic monomer as disclosed herein may be easily polymerized or coated onto a variety of substrates by means of well-established techniques such as heating or by means of actinic irradiation. Preferably, the hydrophilic monomer comprises (meth)acrylate moieties in an amount of from 1 to 10, preferably from 1 to 8, more preferably from 1 to 6. (Meth)acrylate moieties in these amounts give rise to advantages such as good crosslinking properties, without compromising the chemical and mechanical stability of the coatings. That is, the (meth)acrylate moieties may be selected from methacrylate moieties and acrylate moieties, of which acrylate moieties are preferred due to their better performance. Preferably, the hydrophilic monomer comprises acrylate moieties in an amount of from 1 to 10, preferably from 1 to 8, more preferably from 1 to 6.

Preferably, the hydrophilic monomer according to the present disclosure is a monomer according to any one of formulae (I), (II), (III), (IV), (V), (VI), (VII), or (VIII)

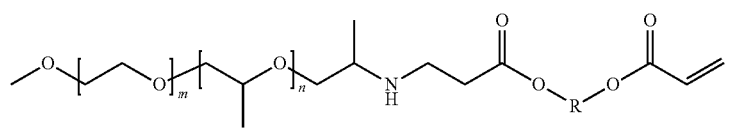

Formula (I)

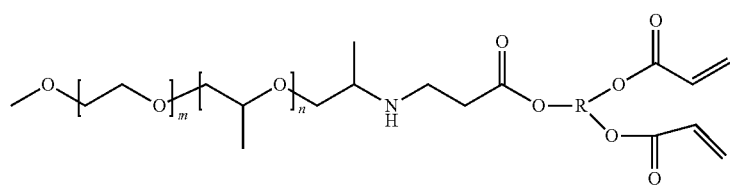

Formula (II)

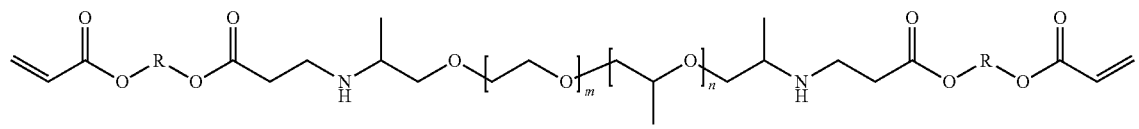

Formula (III)

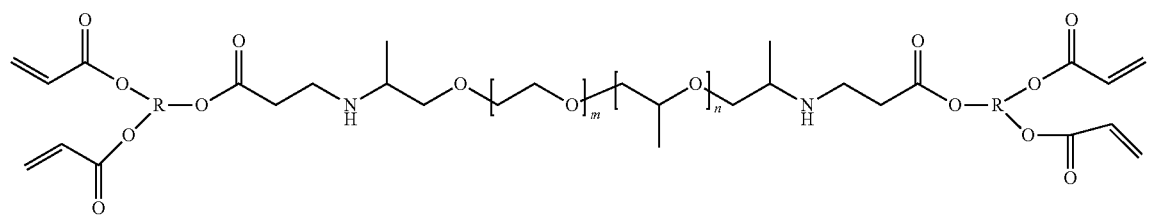

Formula (IV)

Formula (V)
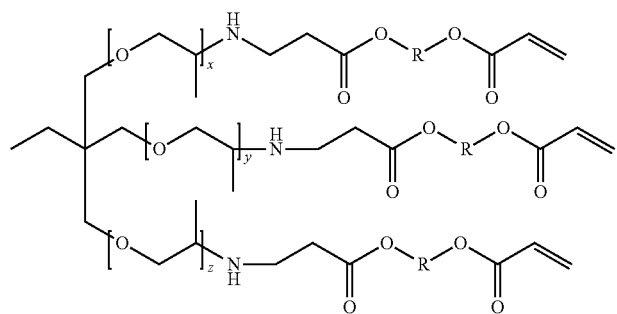
Formula (VI)
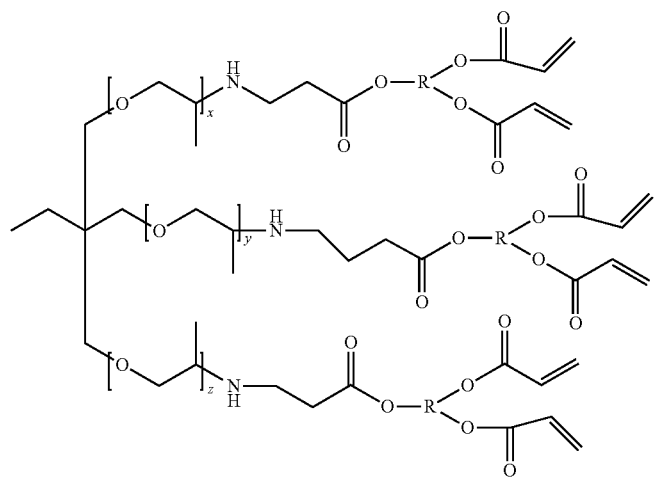
Formula (VII)
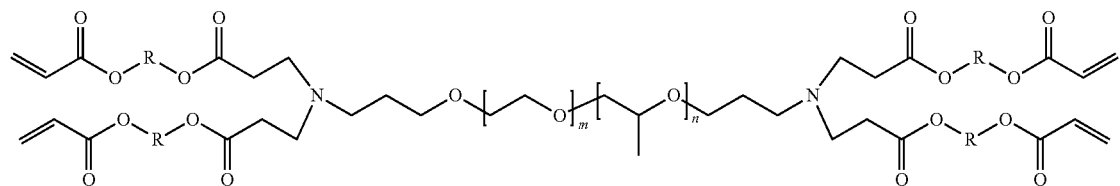
Formula (VIII)
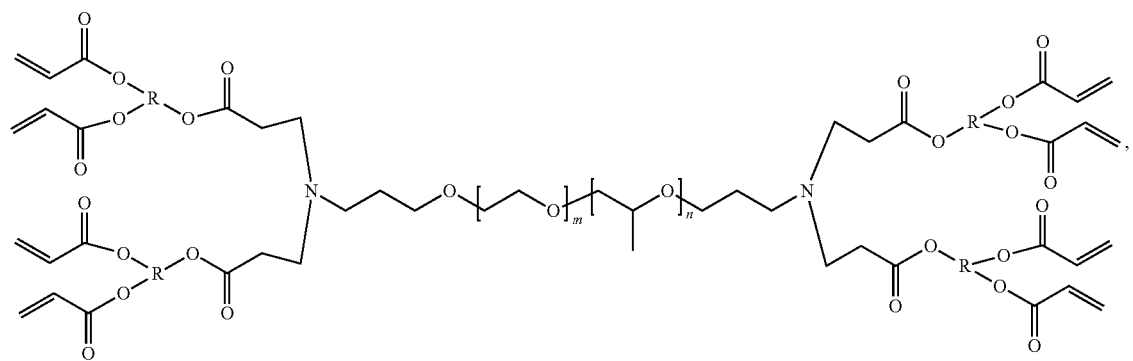

wherein m an n may be different or the same, wherein m and n may each be in a range of from 1 to 100, wherein x, y and z may be different or the same, and may be in the range of from 1 to 100, wherein R is an organic residue, preferably selected from linear or branched alkyl or alkoxy residues. Preferably, m is in the range of from 1 to 70, more preferably from 1 to 50. Similarly, it is preferred that n is in the range of from 1 to 70, more preferably from 1 to 50. X is preferably in the range of from 1 to 70, more preferably from 1 to 50. Y is preferably in the range of from 1 to 70, more preferably from 1 to 50. Z is preferably in the range of from 1 to 70, more preferably from 1 to 50.

It is also preferred that wherein the hydrophilic monomer according to the present disclosure is a monomer according to any one of formulae (IX to XIV)

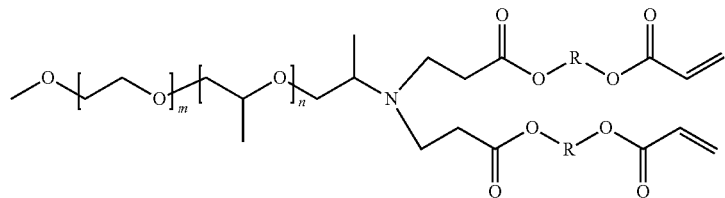

Formula (IX)

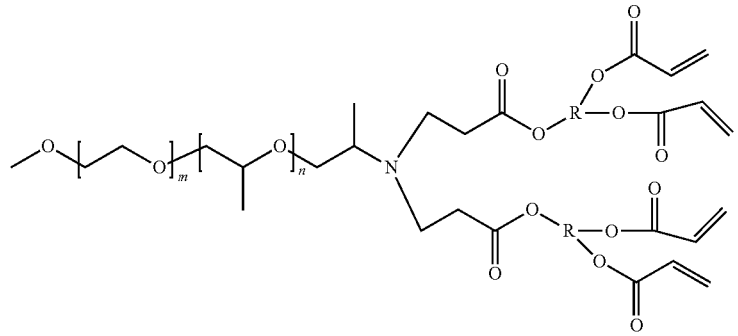

Formula (X)

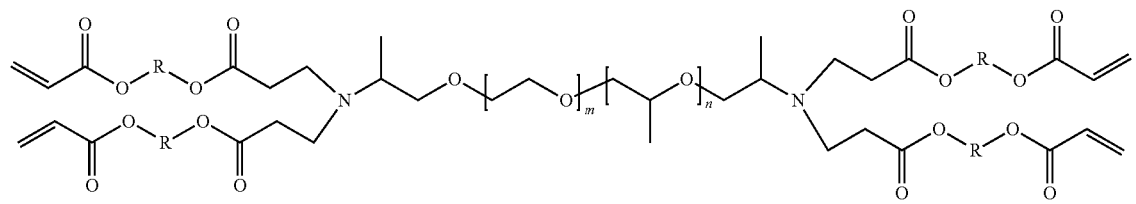

Formula (XI)

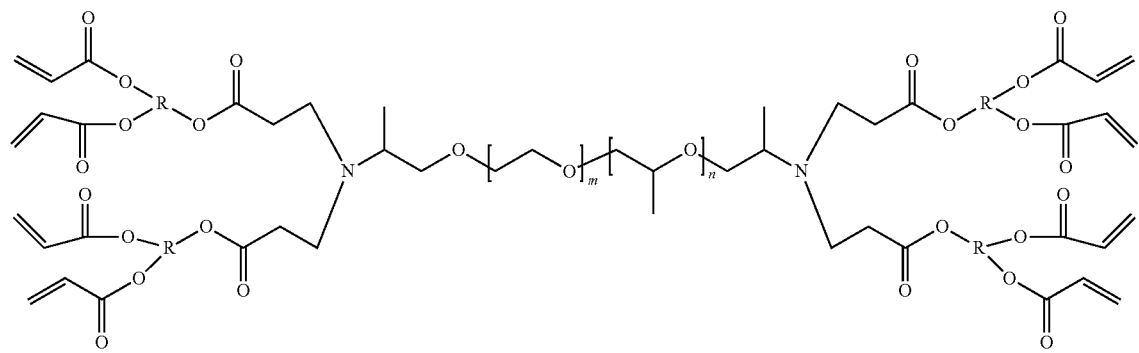

Formula (XII)

-continued

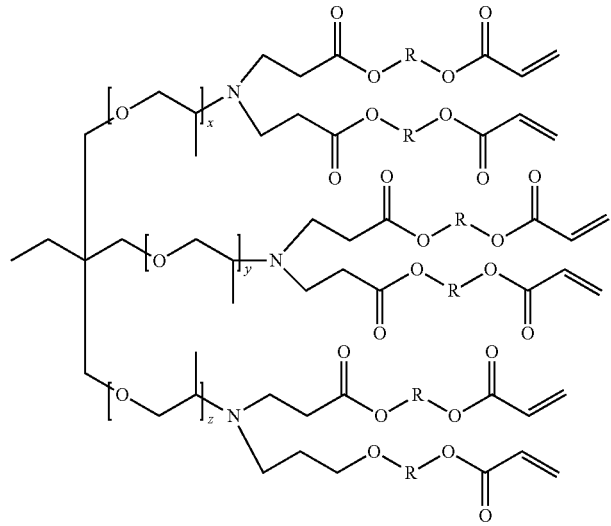

Formula (XIII)

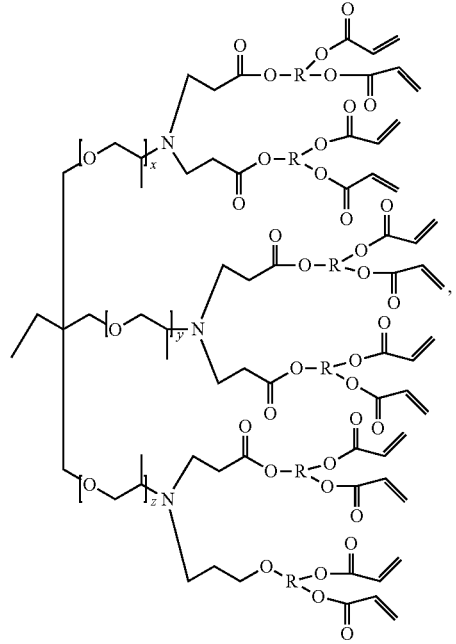

Formula (XIV)

wherein m an n may be different or the same, wherein x, y and z may be different or the same, wherein m and n may each be in a range of from 1 to 100, and wherein R is an organic residue, preferably from linear or branched alkyl or alkoxy. Preferably, m is in the range of from 1 to 70, more preferably from 1 to 50. Similarly, it is preferred that n is in the range of from 1 to 70, more preferably from 1 to 50. X is preferably in the range of from 1 to 70, more preferably from 1 to 50. Y is preferably in the range of from 1 to 70, more preferably from 1 to 50. Z is preferably in the range of from 1 to 70, more preferably from 1 to 50.

The hydrophilic monomer according to the present disclosure is preferably obtained from reacting at least one polyoxyalkylamine with at least one (meth)acrylate compound. Preferably, the at least one polyoxyalkylamine is selected from polyetheramines. It is preferred that the at least one polyoxyalkylamine, preferably the at least one polyetheramine, comprises ethoxy-units and propyloxy-units. In this regard, it is preferred that the polyoxyalkylamine, preferably the at least one polyetheramine comprises at least 5 ethoxy-units, preferably at least 10 ethoxy-units, and more preferably at least 12 ethoxy-units. It is also preferred that the polyoxyalkylamine, preferably the at least one polyetheramine, comprises less than 25 propyloxy-units, preferably less than 20 propyloxy-units, and more preferably less than 15 propyloxy-units. Preferably, the ratio of ethoxy-units to propyloxy-units is in the range of from 1 to 20, preferably from 1 to 15, and more preferably from 1 to 10. It is also preferred that the at last one polyoxyalkylamine, preferably the at least one polyetheramine, exhibits a molecular weight of at least 80 g/mol, preferably at least 100 g/mol, more preferably at least 200 g/mol. Preferably, that the at last one polyoxyalkylamine, preferably the at least one polyetheramine, exhibits a molecular weight of 8000 g/mol and less, preferably 7000 g/mol and less, and more preferably 6000 g/mol and less. Accordingly, it is preferred that the at last one polyoxyalkylamine, preferably the at least one polyetheramine, exhibits a molecular weight in the range of from 80 g/mol to 8000 g/mol, preferably from 100 g/mol to 7000 g/mol, and more preferably from 200 g/mol to 6000 g/mol. It is also preferred that the at last one polyoxyalkylamine, preferably the at least one polyetheramine, is either a monoamine, diamine, or triamine. Polyetheramines which may be advantageously used as the polyoxyalkylamine as described herein are commercially available e.g. from Huntsman under the tradename "Jeffamine®". Examples for Jeffamines® are M1000, M2070, ED900 and T403.

The at least one (meth)acrylate compound is preferably selected from di(meth)acrylates, tri(meth)acrylates, tetra(meth)acrylates, penta(meth)acrylates, and hexa(meth)acrylates. Mono(meth)acrylates will not yield the hydrophilic monomers as disclosed herein. Preferably, the (meth)acrylate compound is selected from diacrylates, triacrylates, tetraacrylates, pentaacrylates, and hexaacrylates. In this regard, it is preferred that the at least one acrylate compound is selected from alkyldiacrylates, alkyltriacrylates, alkyltetraacrylates, alkylpentaacrylates, alkyl hexaacrylates, polyethylene glycol diacrylates, ethoxylated trimethylolpropane triacrylates, and trimethylolpropane triacrylate. Preferably, the at least one acrylate compound is selected from polyethylene glycol diacrylates, preferably having between 2 and 20 ethoxy units. Diacrylates which may be advantageously used for the purposes described herein are commercially available, for example, from Sartomer-Arkema under the trade designations SR 259, SR 344 and SR 610. It is also preferred that the ethoxylated trimethylolpropane triacrylates comprise ethoxy units in an amount of from 4 to 25, prefer-ably between 5 to 23, more preferably between 6 and 20. Exemplary (ethoxylated) trimethylolpropane triacrylates for use herein may be obtained from Sakoma-Arkema under the trade designation SR502 or SR9035 and from ECEM under the trade designation TMPEOTA.

The present disclosure also provides a process for producing the hydrophilic monomers as disclosed herein. The process comprises reacting at least one polyoxyalkylamine with at least one (meth)acrylate compound. It is understood that the at least one polyoxyalkylamine and the at least one (meth)acrylate compounds are compounds as disclosed herein, i.e. as disclosed for the hydrophilic monomers according to the present disclosure. In general, the addition of the amine as disclosed herein to the (meth)acrylates as disclosed herein is believed to follow the mechanism of the well-known Michael-reaction. The process as disclosed herein may yield mono-adducts, i.e. the product of the reaction of an amine moiety with one (meth)acrylate moiety. Also, the process as disclosed herein may yield di-adducts, i.e. the product of the reaction of an amine moiety with two (meth)acrylate moieties (i.e. two (meth)acrylate compounds). In general, polyoxyalkylamine compounds exhibiting at least a certain steric hindrance of the amine moiety will yield the mono-adduct, while without steric hindrance, also the di-adduct may be obtained. For example, the presence of a methyl-group in α-position of the amino-moiety in the polyoxyalkylamine compound may lead to the mono-adduct of this amino-moiety. In this regard, exemplary products of a mono-adduct according to the present disclosure are the hydrophilic monomers according to formulae (I) to (VI). Exemplary products of a di-addition according to the present disclosure are the hydrophilic monomers according to formulae (VII) and (VIII).

If, however, di-adducts are generally desired, the process as disclosed herein preferably comprises presence of at least one catalyst selected from basic catalysts or acidic catalysts. Preferably, the at least one catalyst is selected from inorganic or organic basic catalysts, preferably from organic basic catalysts, more preferably from organic basic catalysts comprising at least one non-nucleophilic amine moiety. It is preferred that the at last one basic catalyst is selected from diazabicycloundecene (DBU), 1,4-diazabicyclo[4.3.0]non-5-ene (DBN) or N,N-Diisopropylethylamine (DIPEA). With regard to acidic catalysts for use herein, it is preferred that it is selected from inorganic or organic acidic catalysts, preferably from organic acidic catalysts, more preferably from organic sulfonic acids. The organic sulfonic acids are preferably selected from aromatic sulfonic acids, preferably from benzene sulfonic acid, para-toluene sulfonic acid, and their fluorinated analogues. Preferred examples are benzene sulfonic acid, p-toluene sulfonic acid and their fluorinated analogues. Preferred examples for inorganic acids are Lewis acids such as calcium nitrate, Fe(III)chloride and $BF_3$. Exemplary products of acid- or base-catalyzed di-addition according to the present disclosure are the hydrophilic monomers according to formulae (IX) to (XIV).

The process according to the present disclosure may be carried out with or without a solvent. If the process is carried out in a solvent, organic solvents well known to the skilled person are preferred. Preferably, the process as described herein is carried out at a temperature of at least 30° C., preferably at least 40° C., more preferably at least 50° C., even more preferably at least 60° C. Lower temperature will slow the reaction considerably down and/or produce yields generally deemed not acceptable for industrial processes. It is also preferred that the process as described herein is carried out at a temperate of 150° C. and less, preferably 140° C. and less, preferably 120° C. and less. Higher temperature will yield undesired side reactions such as polymerization of the components. Preferably, the process as described herein is carried out at a temperature in the range of from 30 to 150° C., preferably from 40 to 140° C., more preferably from 50 to 120° C.

The hydrophilic monomers according to the present disclosure are highly suitable for producing hydrophilic coatings on a number of substrates, in particular on plastic materials. Accordingly, the present disclosure provides a coating obtained from the hydrophilic monomers as disclosed herein. The coating may be obtained by conventional and well-established means known to the skilled person for coating substrates, in particular polymeric materials/plastics with (meth)acrylate-moiety bearing monomers. Preferably, the coating is obtained by applying the hydrophilic monomer onto a substrate and curing the hydrophilic monomer with actinic irradiation. Applying the hydrophilic monomers as described herein may preferably be carried out by application of the hydrophilic monomers in a solution. That is, a solution comprising the hydrophilic monomers may be applied onto the substrate by known means, or the substrate may be immersed into the solution comprising the hydrophilic monomers. Generally, the application of the hydrophilic monomers, preferably in a solution, onto the surface of a substrate and subsequent curing of the hydrophilic monomers is advantageous due to the well-established means for both application and curing, even by fast automatic means and on an industrial scale. With regard to the actinic irradiation, it is preferably selected from electron beam ("e-beam") and UV light. Both are well-established in the art, and apparatuses for irradiating are commercially available, even automated for continuous operation. The substrate may comprise any material suitable for being coating.

Preferably, the substrate material is selected from polymeric, metallic and glass surfaces, preferably from polymeric surfaces. Hereunder, the term "polymeric" may be used interchangeably with the term "plastics". Preferred example for polymeric materials or plastics are polycarbonate, polyvinylchloride (PVC), polymethylmethacrylate (PMMA), acrylonitrile-butadiene-styrene terpolymer (ABS), polyethylene (PE), polypropylene (PP) and polyethylersulfones (PES). The coatings according to the present invention provided on these substrates are hydrophilic in nature and exhibit good mechanical and chemical resistance. Hence, the coatings and the coated substrates are excellently suited for applications where hydrophilic surfaces are desired. Hydrophilic surfaces, e.g. surfaces which are more hydrophilic than the surfaces of otherwise uncoated plastics, exhibit a particular low tendency for adsorption of organic material such as proteins. This may particularly interesting for applications in the biopharmaceutical industry, medical applications, or in the production of foods and beverages, e.g. for vessels, sealants, filters, membranes and the like. The advantageous effect of a more hydrophilic surface in these cases mean less adsorption of organic material, in particular proteins, and this means less tendency for fouling. The coatings may therefore be easily sterilized, and may stay sterile for longer times due to the low tendency to adsorb organic material. Furthermore, the hydrophilic coatings as described herein may be useful where anti-fogging properties are desired. This may be the case, for example, for window panels for vehicles such as cars, or for personal safety equipment such as visors of helmets of face protection devices.

Accordingly, the present disclosure further provides a use of the hydrophilic monomers as described herein for coating substrates, preferably in the biopharmaceutical industry, medical applications, or in the production of foods and beverages. It is preferred that the use according to the present disclosure comprises coating of vessels, sealants, filters and membranes.

The present disclosure may further be exemplified by the following items:

1. A hydrophilic monomer, comprising
    (i) at least one amino moiety;
    (ii) at least one polyoxyalkylene unit; and
    (iii) at least one (meth)acrylate moiety.
2. The hydrophilic monomer according to item 1, wherein the at least one polyoxyalkylene unit is selected from polyethers.
3. The hydrophilic monomer according to item 1 or item 2, wherein the at least one amino moiety is at least one secondary amino moiety and/or at least one tertiary amino moiety.
4. The hydrophilic monomer according to item 3, wherein the monomer comprises at least one secondary amino moiety.
5. The hydrophilic monomer according to item 4, wherein the monomer comprises one secondary amino moiety, two secondary amino moieties, three secondary amino moieties, or four secondary amino moieties.
6. The hydrophilic monomer according to item 3, wherein the monomer comprises at least one tertiary amino moiety.
7. The hydrophilic monomer according to item 6, wherein the monomer comprises one tertiary amino moiety, two amino moieties, three amino moieties, or four tertiary amino moieties.
8. The hydrophilic monomer according to any one of the preceding items, wherein the monomer comprises (meth)acrylate moieties in an amount of from 1 to 10, preferably from 1 to 8, more preferably from 1 to 6.
9. The hydrophilic monomer according to any one of the preceding items, wherein the monomer comprises acrylate moieties in an amount of from 1 to 10, preferably from 1 to 8, more preferably from 1 to 6.
10. The hydrophilic monomer according to any one of the preceding items, wherein the monomer is a monomer according to any one of formulae (I), (II), (III), (IV), (V), (VI), (VII), or (VIII)

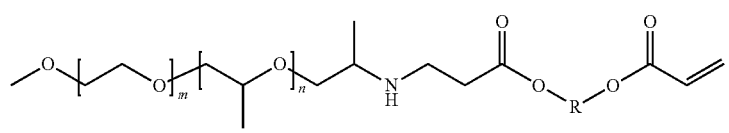

Formula (I)

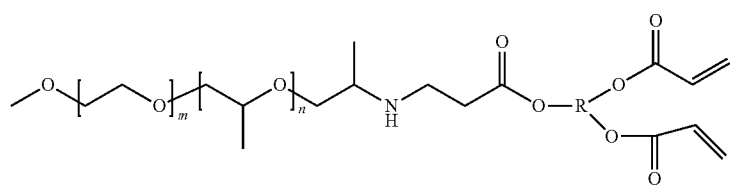

Formula (II)

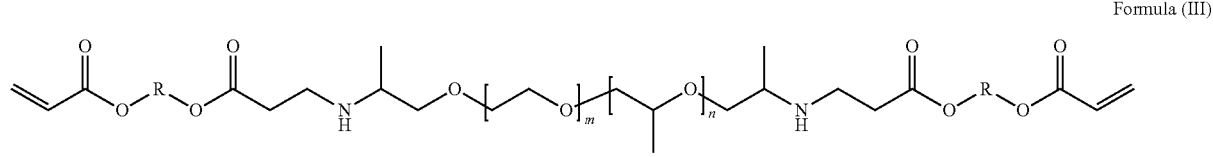

Formula (III)

Formula (IV)
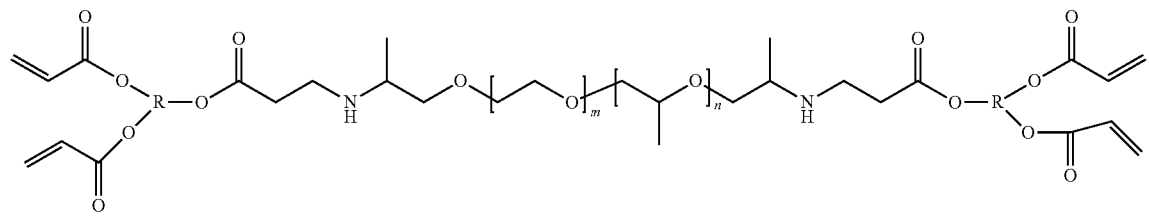
Formula (V)
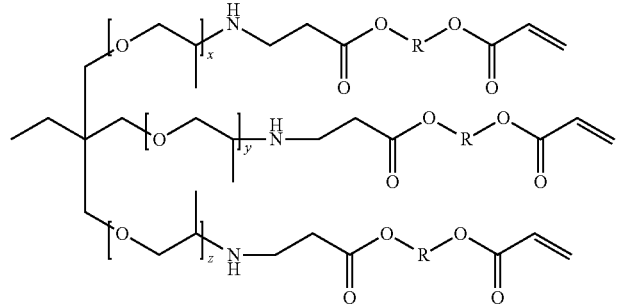
Formula (VI)
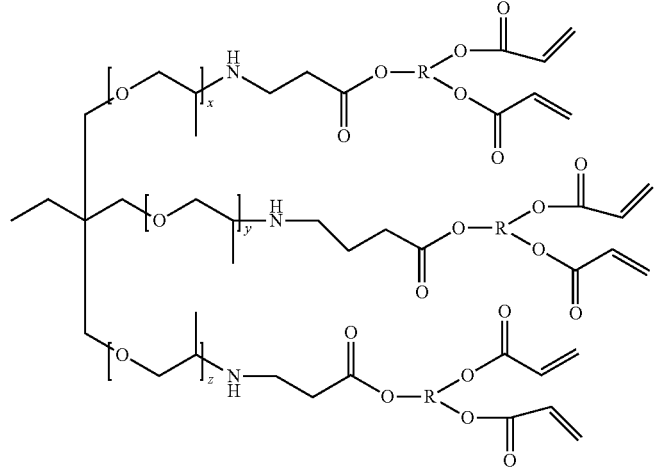
Formula (VII)
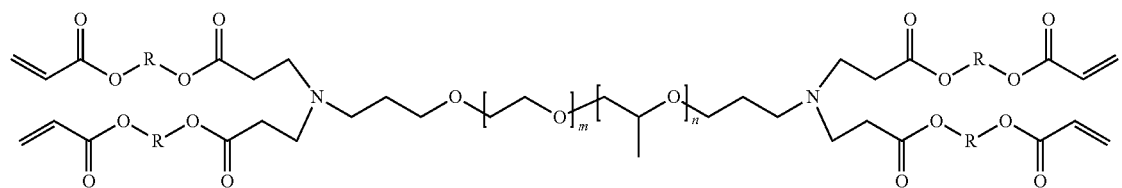
Formula (VIII)
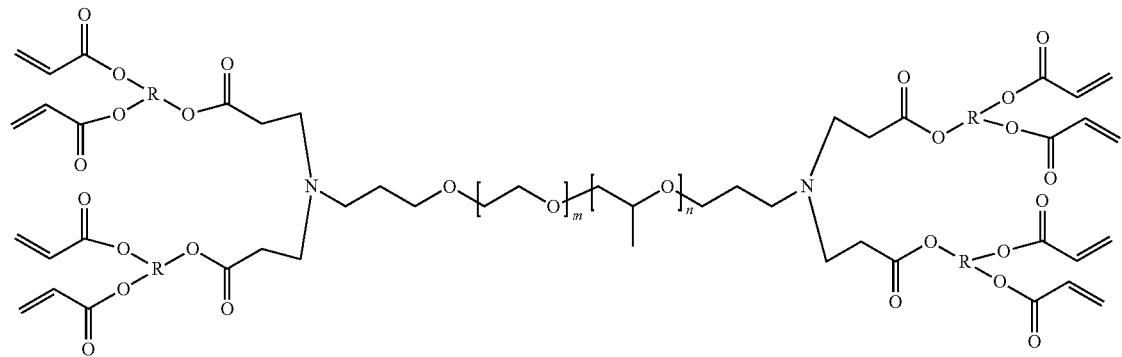

wherein R is a linear or branched alkyl or alkoxy,
wherein m an n may be different or the same,
wherein m and n may each be in a range of from 1 to 100.
11. The hydrophilic monomer according to any one of items 1 to 10, wherein the monomer is a monomer according to any one of formulae (IX to XIV)
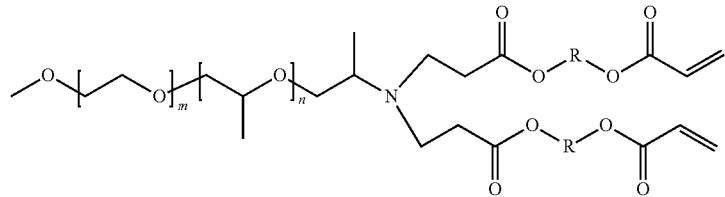
Formula (IX)
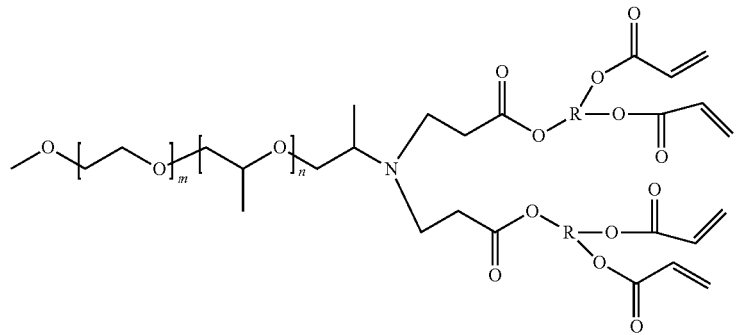
Formula (X)
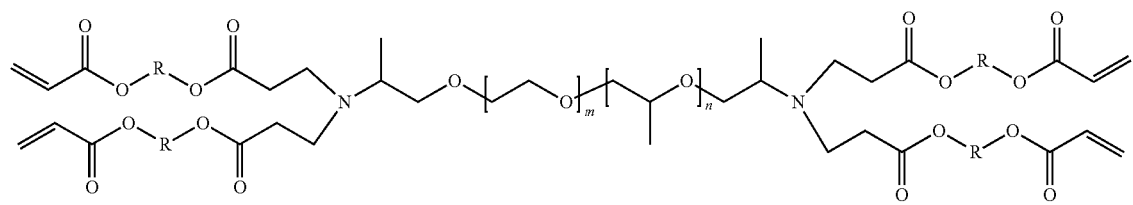
Formula (XI)
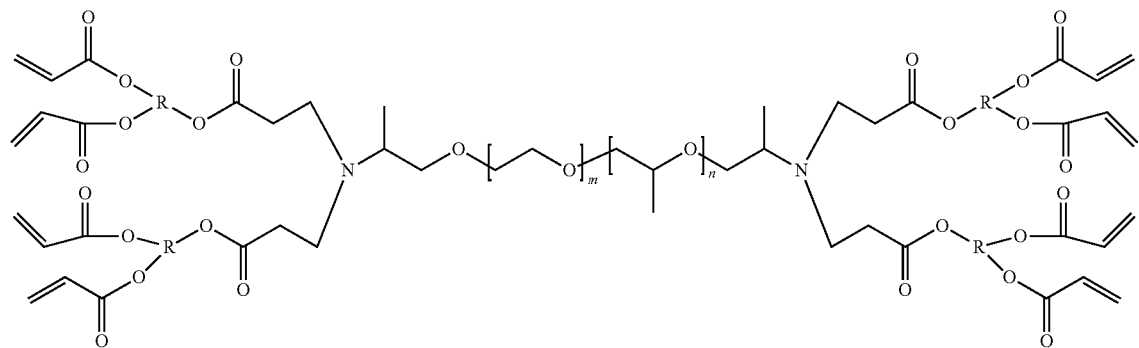
Formula (XII)

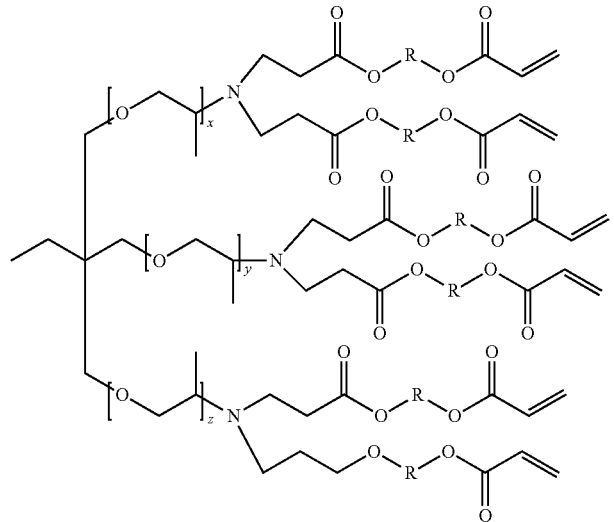

Formula (XIII)

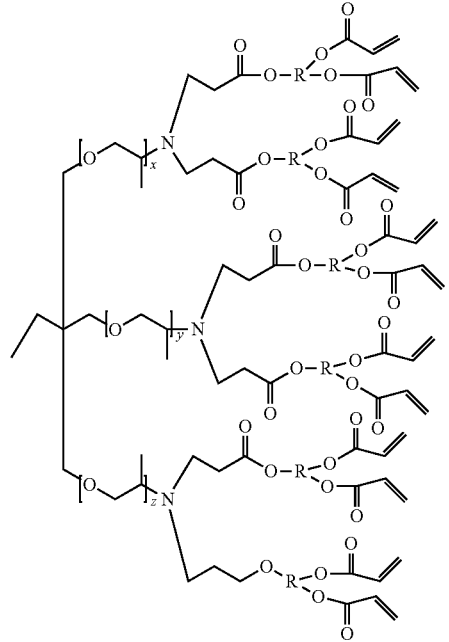

Formula (XIV)

wherein R is a linear or branched alkyl or alkoxy,
wherein m an n may be different or the same,
wherein m and n may each be in a range of from 1 to 100;
wherein x, y, z may be different or the same,
wherein x, y, z may be each in a range of from 1 to 100.

12. The hydrophilic monomer according to any one of the preceding items, wherein m is in the range of from 1 to 70, more preferably from 1 to 50.

13. The hydrophilic monomer according to any one of the preceding items, wherein n in the range of from 1 to 70, more preferably from 1 to 50.

14. The hydrophilic monomer according to any one of the preceding items, obtained from reacting at least one polyoxyalkylamine with at least one (meth)acrylate compound.

15. The hydrophilic monomer according to item 14, wherein the at least one polyoxyalkylamine is selected from polyetheramines.

16. The hydrophilic monomer according to item 14 or item 15, wherein the polyoxyalkylmine is a polyetherdiamine comprising ethoxy-units and propyloxy-units.

17. The hydrophilic monomer according to item 16, wherein the ratio of ethoxy-units to propyloxy-units EO:PO is in the range of from 1 to 20, preferably from 1 to 15, more preferably from 1 to 10.

18. The hydrophilic monomer according to any one of items 14 to 17, wherein the (meth)acrylate compound is selected from di(meth)acrylates, tri(meth)acrylates, tetra(meth)acrylates, penta(meth)acrylates, and hexa(meth)acrylates.

19. The hydrophilic monomer according to any one of items 14 to 17, wherein the (meth)acrylate compound is an acrylate compound selected from diacrylates, triacrylates, tetraacrylates, pentaacrylates, and hexaacrylates.

20. The hydrophilic monomer according to item 19, wherein the at least one acrylate compound is selected from alkyldiacrylates, alkyltriacrylates, alkyltetraacrylates, alkylpentaacrylates, alkyl hexaacrylates, polyethylene glycol diacrylates, ethoxylated trimethylolpropane triacrylates, and trimethylolpropane triacrylate, 21. The hydrophilic monomer according to item 20, wherein the at least one acrylate compound is selected from polyethylene glycol diacrylates, preferably having between 2 and 20 ethoxy units.

22. The hydrophilic monomer according to item 20, wherein the ethoxylated trimethylolpropane triacrylates comprise ethoxy units in an amount of from 4 to 25, preferably between 5 to 23, more preferably between 6 and 20.

23. A process for producing a hydrophilic monomer, comprising reacting at least one polyoxyalkylamine with at least one (meth)acrylate compound.

24. The process according to item 23, wherein the at least one polyoxyalkylamine is selected from polyetheramines, more preferably from polyetherdiamines.

25. The process according to any one of items 23 to 24, wherein the (meth)acrylate compound is selected from di(meth)acrylates, tri(meth)acrylates, tetra(meth)acrylates, penta(meth)acrylates, and hexa(meth)acrylates.

26. The process according to item 25, wherein the (meth)acrylate compound is selected from diacrylates, triacrylates, tetraacrylates, penta(meth)acrylates, and hexaacrylates.

27. The process according to any one of items 23 to 26, wherein the polyoxyalkylamine exhibits a molecular weight of at least 80 g/mol, preferably at least 100 g/mol, more preferably at least 200 g/mol.

28. The process according to any one of items 23 to 27, wherein the polyoxyalkylamine exhibits a molecular weight of 8000 g/mol and less, preferably of 7000 g/mol and less, more preferably of 6000 g/mol and less.

29. The process according to any one of items 23 to 28, wherein the polyoxyalkylamine exhibits a molecular weight in the range of from 80 g/mol to 8000 g/mol, preferably from 100 g/mol to 7000 g/mol, and more preferably from 200 g/mol to 6000 g/mol.

30. The process according to any one of items 23 to 29, wherein the polyoxyalkylamine is a polyetherdiamine comprising ethoxy-units and propyloxy-units.

31. The process according to item 30, wherein the ratio of ethoxy-units to propyloxy-units EO:PO is in the range of from 1 to 20, preferably from 1 to 15, more preferably from 1 to 10.

32. The process according to any one of items 23 to 31, wherein the reaction yields the monoadduct of (meth)acrylate addition to each amine moiety, or the diadduct of (meth)acrylate addition to each amine moiety.

33. The process according to any one of items 21 to 32, wherein reacting at least one polyoxyalkylamine with at least one (meth)acrylate compound comprises presence of at least one catalyst selected from basic catalysts or acidic catalysts.

34. The process according to item 33, wherein the at least one catalyst is selected from inorganic or organic basic catalysts, preferably from organic basic catalysts, more preferably from organic basic catalysts comprising at least one non-nucleophilic amine moiety.

35. The process according to item 34, wherein the basic catalyst is selected from last one basic catalyst is selected from diazabicycloundecene (DBU), 1,4-diazabicyclo[4.3.0]non-5-ene (DBN) or N, N-Diisopropylethylamine (DIPEA).

36. The process according to item 34, wherein the at least one catalyst is selected from inorganic or organic acidic catalysts, preferably from organic acidic catalysts, more preferably from organic sulfonic acids.

37. The process according to item 35, wherein the organic sulfonic acids are selected from aromatic sulfonic acids, preferably from benzene sulfonic acid, para-toluene sulfonic acid, and their fluorinated analogues, and wherein the inorganic acidic catalysts are selected from inorganic acids, preferably from Lewis acids, more preferably from calcium nitrate, Fe(III)chloride and $BF_3$.

38. The process according to any one of items 23 to 37, wherein the reaction is carried out in a solvent, preferably an organic solvent.

39. The process according to any one of items 23 to 38, wherein the reaction is carried out at a temperature of at least 30° C., preferably at least 40° C., more preferably at least 50° C., even more preferably at least 60° C.

40. The process according to any one of items 23 to 39, wherein the reaction is carried out at a temperate of 150° C. and less, preferably 140° C. and less, preferably 120° C. and less.

41. The process according to any one of items 23 to 40, wherein the reaction is carried out at a temperature in the range of from 30 to 150° C., preferably from 40 to 140° C., more preferably from 50 to 120° C.

42. Coating obtained from the hydrophilic monomer according to any one of items 1 to 22.

43. Coating according to item 42, obtained by coating hydrophilic monomer onto a substrate and curing the coating by actinic irradiation.

44. Coating according to item 42, wherein coating takes place by coating a solution comprising the hydrophilic monomer.

45. Coating according to item 43 or item 44, wherein the actinic irradiation is selected from ultraviolet light and electron-beam.

46. Coating according to any one of items 42 to 45, wherein the substrate is selected from polymeric, metallic and glass surfaces, preferably from polymeric surfaces.

47. Use of the hydrophilic monomer according to any one of items 1 to 22 for coating substrates.

48. Use according to item 47, comprising coating of substrates in the biopharmaceutical industry, production of medical equipment, in the beverages industry or in the food production industry.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated. The exemplary hydrophilic monomers according to the present disclosure are indicated as "PEA" and a number. These are examples according to the present disclosure. Finally, coating experiments are described. They are indicated below as "Ex." and a number: these are also examples according to the present disclosure.

Test Methods

Contact Angle Testing

Static water contact angles were measured using a DSA100 Contact Angle analyzer, commercially available from Krüss GmbH. The values of the contact angles are the mean values of several measurements and are reported in degrees.

Cross-Cut Test

The cross-cut test is a method of determining the resistance of paints and coatings to separation from substrates by utilizing a tool to cut a right angle lattice pattern into the coating, penetrating all the way to the substrate. The cutted pattern is visually inspected after it is pulled off with a tape and rated going from a perfect intact coating (perfect=0) to a flaked coating at the edges (complete destruction=5).

The test was performed according to DIN EN ISO 2409 and used to determine the adhesion of the coatings on polycarbonate surfaces. As substrates, polycarbonate test plates obtained from Rocholl GmbH, Germany, were employed.

Reagents

TABLE 1

Reagents used in the examples.

| | |
|---|---|
| BDDA | 1,4 butanediol diacrylate, available from BASF as Laromer BDDA |
| Irgacure 500 | photoinitiator, available from BASF |
| Jeffamine ® M1000 | monofunctional polyetheramine with MW1000 and PO/EO ratio 3/19, available from Huntsman |
| Jeffamine ® M2070 | monofunctional polyetheramine with MW2000 and PO/EO ratio 10/32, available from Huntsman |
| Jeffamine ® ED900 | difunctional polyetheramine with MW900 and PO/EO ratio 3.6/15.5, available from Huntsman |
| Jeffamine ® T403 | triifunctional polyetheramine with MW440 (only PO), available from Huntsman |
| Jeffamine ® D400 | difunctional polyetheramine with MW400 and only PO groups, available from Huntsman |
| Jeffamine ® D2000 | difunctional polyetheramine with MW2000 and only PO groups, available from Huntsman |
| Jeffamine ® ED600 | difunctional polyetheramine with MW600 and PO/EO ratio 3.6/9.0, available from Huntsman |
| MEHQ | hydroquinone monomethyl ether, available from Sigma-Aldrich |
| PTZ | phenothiazine, available from Sigma-Aldrich |
| SR259 | PEG200 diacrylate (4 EO units), available from Sartomer-Arkema |
| SR344 | PEG400 diacrylate (9 EO units), available from Sartomer-Arkema |
| SR355 | DiTMPTTA: ditrimethylolpropane tetraacrylate, available from Sartomer-Arkema |
| SR610 | PEG600 diacrylate (13 EO units), available from Sartomer-Arkema |
| SR502 | TMPEOTA with 9 EO units, available from Sartomer-Arkema |
| SR9035 | TMPEOTA with 15 EO units, available from Sartomer-Arkema |
| TMPEOTA | ethoxylated trimethylolpropane triacrylate |
| TMPTA | trimethylolpropane triacrylate, available from ECEM |
| 1,13 TTD | 4,7,10-trioxatridecane-1,13-diamine; 3,3'-oxybis(ethyleneoxy)bis(propylamine), available from BASF |
| BSA | benzene sulfonic acid, available from Sigam-Aldrich |
| $Ca(NO_3)_2$ | calcium nitrate, available from Sigma-Aldrich |
| DBU | diazabicyclo-undecene, available from Sigma-Aldrich |
| PTSA•$H_2O$ | p.toluenesulfonic acid monohydrate |
| TMG | tetramethylguanidine, available from Sigma-Aldrich |

Reaction Procedure 1: Polyetheramine/Acrylate Mole Ratio 1:2

A 100 ml polymerization bottle was charged respectively with TM PTA (7.40 g; 25 mmole), MEHQ (10 mg), PTZ (3 mg) and Jeffamine® M2070 (25.00 g; 12.5 mmole).

The polymerization bottle was run for 16 hours in a preheated Launder-O-meter at 80° C., resulting in a viscous liquid. According to NMR spectroscopy, the reaction product contained 97% mono-adduct, 3% di-adduct and no residual Jeffamine® M2070.

Other polyetheramine acrylates were prepared using the same procedure, resulting in mainly the mono-adducts, small amounts of di-adduct and no residual Jeffamine®.

The experiments are summarized in table 2.

TABLE 2

Polyetheramine-acrylate experiments according to the present disclosure. Amounts in mole ratios.

| | Jeffamine ® | | | | Acrylate monomers | | | | | | | Polyether amine acrylate type |
|---|---|---|---|---|---|---|---|---|---|---|---|---|
| | M 1000 | M 2070 | ED900 | T 403 | TMPTA | BDDA | SR502 | SR 9035 | SR 259 | SR 344 | SR 610 | |
| PEA1 | 1 | | | | 2 | | | | | | | II |
| PEA2 | | 1 | | | 2 | | | | | | | II |
| PEA3 | 1 | | | | | 1.1 | | | | | | II |
| PEA4 | | 1 | | | | 1.1 | | | | | | II |
| PEA5 | 1 | | | | | | 2 | | | | | I |
| PEA6 | 1 | | | | | | | 2 | | | | II |
| PEA7 | 1 | | | | | | | | 2 | | | II |
| PEA8 | | 1 | | | | | 2 | | | | | I |
| PEA9 | | 1 | | | | | | 2 | | | | II |
| PEA10 | | 1 | | | | | | | 2 | | | II |
| PEA11 | | | 1 | | 4 | | | | | | | III |
| PEA12 | | 1 | | | | 1.1 | | | | | | I |
| PEA13 | | 1 | | | | | | | 1.1 | | | I |
| PEA14 | | 1 | | | | | | | 2 | | | I |
| PEA15 | | 1 | | | | | | | | 1.1 | | I |
| PEA16 | | 1 | | | | | | | | 2 | | I |
| PEA17 | | 1 | | | | | | | | | 1.1 | I |
| PEA18 | | 1 | | | | | | | | | 2 | I |
| PEA19 | | | | 1 | | | | | 3 | | | V |
| PEA20 | | | | 1 | | | | | | 3 | | V |
| PEA21 | | | | 1 | | | | | | | 3 | V |
| PEA22 | | | | 1 | | | | 3 | | | | VI |
| PEA23 | | | | 1 | | | 6 | | | | | V |
| PEA24 | | | | 1 | | | | | | 6 | | V |
| PEA25 | | | | 1 | | | | | | | 6 | V |
| PEA26 | | | | 1 | | | | 6 | | | | VI |
| PEA27 | | | 1 | | | | | 4 | | | | IV |
| PEA28 | | | 1 | | | | | 6 | | | | IV |

Reaction Procedure 2: Polyetheramine/Acrylate Mole Ratio 1:6

A 100 ml polymerization bottle was charged respectively with SR259 (40.36 g; 134 mmole), MEHQ (14 mg), PTZ (5 mg) and 1,13 TTD (4.90 g; 22.3 mmole).

The polymerization bottle was run for 16 hours in a preheated Launder-O-meter at 80° C., resulting in a clear, light yellow semi-viscous liquid. According to NMR spectroscopy, the reaction product contained only di-adduct, no mono-adduct and no residual 1,13 TTD (below detection limit).

Other polyetheramine acrylates were prepared using the same procedure, resulting in mainly the di-adducts (>90%), smaller amounts of mono-adduct (<10%) and no residual polyetheramine.

The experiments are summarized in table 3.

TABLE 3

Polyetheramine-acrylate experiments according to the present disclosure. Amounts in mole ratios.

| | Amine 1,13 TTD | Acrylate monomers | | | | | Polyetheramine acrylate type |
|---|---|---|---|---|---|---|---|
| | | SR 259 | SR 344 | SR 610 | SR 502 | SR 9035 | |
| PEA29 | 1 | 4 | | | | | VII |
| PEA30 | 1 | | 4 | | | | VII |
| PEA31 | 1 | | | 4 | | | VII |
| PEA32 | 1 | | | | 4 | | VIII |

TABLE 3-continued

Polyetheramine-acrylate experiments according to the present disclosure.
Amounts in mole ratios.

|  | Amine 1,13 TTD | Acrylate monomers | | | | | Polyetheramine acrylate type |
|---|---|---|---|---|---|---|---|
|  |  | SR 259 | SR 344 | SR 610 | SR 502 | SR 9035 |  |
| PEA33 | 1 |  |  |  |  | 4 | VIII |
| PEA34 | 1 | 6 |  |  |  |  | VII |
| PEA35 | 1 |  | 6 |  |  |  | VII |
| PEA36 | 1 |  |  |  | 6 |  | VIII |
| PEA37 | 1 |  |  |  |  | 6 | VIII |

Reaction Procedure 3: Acrylate Di-Adducts: Monofunctional Polyetheramines with Diacrylates A 100 ml reaction bottle was charged respectively with BDDA (15.59 g; 79 mmole), MEHQ (25 mg), PTZ (10 mg), Jeffamine® M1000 (35.00 g; 35.8 mmole) and BSA (1.52 g; 3% on solids). The reaction bottle was run for 24 hours in a preheated Launder-O-meter at 90° C., resulting in a clear, brown, semi-viscous liquid. According to NMR spectroscopy, the reaction product contained 30% mono-adduct, 70% di-adduct and no residual Jeffamine® M1000. In general, monofunctional polyetheramine acrylate of type IX were obtained.

The ratios of the ingredients used are listed in table 4 below as PEA 38. The reaction was repeated with a different diacrylate and summarized as PEA 39 in table 4, yielding 68% of the di-adduct and 32% of the mono-adduct.

TABLE 4

Ratios for reaction procedure 3. Amounts given in grams except when stated otherwise.

|  | Jeffamine® M1000 | BDDA | SR 259 | MEHQ [mg] | PTZ [mg] | BSA |
|---|---|---|---|---|---|---|
| PEA38 | 35.00 | 15.59 |  | 25 | 10 | 1.518 |
| PEA39 | 30.00 |  | 20.38 | 25 | 10 | 1.511 |

Reaction Procedure 4: Acrylate Di-Adducts: Monofunctional Polyetheramines with Tri- or Higher Acrylates The general sequence of previous procedures was followed, except that the ingredients and ratios of table 5 were employed. Monofunctional Jeffamines® were reacted with tri- or higher acrylates. In general, di-adduct polyetheramine acrylates of type X were obtained.

TABLE 5

Ratios for reaction procedure 4. Amounts given in grams except when stated otherwise.

|  | Jeffamine® M2070 | TMPTA | PTSA × H$_2$O | BSA | DBU | MEHQ [mg] | PTZ [mg] |
|---|---|---|---|---|---|---|---|
| Comp. ex. 3 | 31 | 10.09 |  |  |  | 12 | 4 |
| PEA40 | 31 | 10.09 | 0.411 |  |  | 12 | 4 |
| PEA41 | 31 | 10.09 |  | 0.411 |  | 12 | 4 |
| PEA42 | 31 | 10.09 |  |  | 0.411 | 12 | 4 |

The results are summarized in table 6.

TABLE 6

Yields of mono-adduct and di-adducts of Comp. Ex. 3, and PEA40-42. As evidenced, acid-catalysed or base-catalysed reactions generally yield much more di-adduct than the uncatalyzed reaction according to comp. ex. 3.

| Experiment | mono-adduct | di-adduct |
|---|---|---|
| Comp. Ex. 3 | 80% | 20% |
| PEA40 | 16% | 84% |
| PEA41 | 9% | 91% |
| PEA42 | 25% | 75% |

Table 6: Yields of mono-adduct and di-adducts of Comp. Ex. 3, and PEA40-42. As evidenced, acid-catalysed or base-catalysed reactions generally yield much more di-adduct than the uncatalyzed reaction according to comp. ex. 3.

Reaction Procedure 5: Acrylate Di-Adducts: Monofunctional Polyetheramines with Tri- or Higher Acrylates The general sequence of previous procedures was followed, except that the ingredients and ratios of table 7 were employed. Difunctional Jeffamine® were reacted with diacrylates. In general, polyetheramine acrylate di-adducts of type XI were obtained.

TABLE 7

Ratios for reaction procedure 5. Amounts given in grams except when stated otherwise.

|  | Jeffamine® ED600 | Jeffamine® ED00 | SR 259 | BSA | MEHQ [mg] | PTZ [mg] |
|---|---|---|---|---|---|---|
| PEA43 | 9 |  | 41.18 | 1.505 | 25 | 10 |
| PEA44 |  | 14.7 | 35.52 | 1.506 | 25 | 10 |

The yields are summarized in table 8.

TABLE 8

Yields of mono-adduct and di-adducts of PEA43 and PEA44.

| Experiment | mono-adduct | di-adduct |
|---|---|---|
| PEA43 | 27% | 73% |
| PEA44 | 24% | 76% |

Reaction Procedure 6: Acrylate Di-Adducts Difunctional Polyetheramines with Tri- or Higher Acrylates The general sequence of previous procedures was followed, except that the ingredients and ratios of table 9 were employed. Difunctional Jeffamine® were reacted with tri- or higher acrylates. In general, polyetheramine acrylate di-adducts of type XII were obtained.

TABLE 9

Ratios for reaction procedure 6.
Amounts given in grams except when stated otherwise.

| | Jeff-amine® ED600 | Jeff-amine® ED00 | TMPTA | BSA | MEHQ [mg] | PTZ [mg] |
|---|---|---|---|---|---|---|
| PEA45 | 9.20 | | 41.26 | 1.51 | 25 | 10 |
| PEA46 | | 15.0 | 35.52 | 1.52 | 25 | 10 |

The yields are summarized in table 10.

TABLE 10

Yields of mono-adduct and di-adducts of PEA45 and PEA46.

| Experiment | mono-adduct | di-adduct |
|---|---|---|
| PEA45 | 20% | 80% |
| PEA46 | 25% | 75% |

UV-Coating of Polycarbonate Substrates
Substrate Preparation

Polycarbonate test plates were cleaned with IPA before use.

Coating Formulations

Coating formulations were prepared by mixing the monomers with photo-initiator and a small amount of the fluoro-surfactant FC-4430 to improve the wetting on the substrate. For all entries also a small amount of Ebecryl P116 was added as co-initiator.

Coating Application and UV-Curing

The formulations were coated on the test plates using a 6p K-bar (available from RK Print Coat Ltd, UK), followed by curing with UV-light from a high intensity Hg H-bulb under air atmosphere for 1 or 2 passes. Each pass corresponds to a total UV-dose (A,B,C,V) of 1850 mJ/cm$^2$.

The corresponding ratios are summarized in table 11.

TABLE 11

UV-coatings. Ratios in g except for FC-4439 which is in ppm.

| | PEA2 | PEA4 | SR 502 | SR 9035 | Ebecryl P116 | Irgacure 500 | FC-4430 [ppm] |
|---|---|---|---|---|---|---|---|
| Comp. 1 | | | 97 | | 3 | 6 | 2000 |
| Comp. 2 | | | | 97 | 3 | 6 | 2000 |
| Ex. 1 | 97 | | | | 3 | 6 | 2000 |
| Ex. 2 | | 97 | | | 3 | 6 | 2000 |
| Ex. 3 | 65 | | 32 | | 3 | 6 | 2000 |
| Ex. 4 | | 65 | 32 | | 3 | 6 | 2000 |

With the coatings on polycarbonate plates, water contact angle as well as x-cut tests were carried out. As comparative experiment comp. 3, and uncoated polycarbonate plate was used. The results are summarized in table 12.

TABLE 12

Results of water contact angle and x-cut test.

| | Water contact angle (°) | x-cut test |
|---|---|---|
| Comp. 1 | 75 | no pass |
| Comp. 2 | 66 | pass |
| Comp. 3 | 79 | pass |
| Ex. 1 | x | pass |
| Ex. 2 | x | pass |
| Ex. 3 | x | pass |
| Ex. 4 | x | pass |

In table 12, listing "x" with regard to water contact angle means that the water drop spreads immediately. This indicates that UV-coatings obtained from the hydrophilic monomers according to the present disclosure provide excellent hydrophilicity to a polycarbonate surface.

The invention claimed is:

1. A hydrophilic monomer, comprising
   (i) at least one amino moiety;
   (ii) at least one polyoxyalkylene unit; and
   (iii) at least one acrylate moiety,
   wherein at least one amino moiety is at least one secondary amino moiety and/or at least two tertiary amino moieties.

2. The hydrophilic monomer according to claim 1, wherein the at least one polyoxyalkylene unit is selected from polyethers.

3. The hydrophilic monomer according to claim 1, wherein the monomer comprises one secondary amino moiety, two secondary amino moieties, three secondary amino moieties, or four secondary amino moieties.

4. The hydrophilic monomer according to claim 1, wherein the monomer comprises one tertiary amino moiety, two tertiary amino moieties, three tertiary amino moieties, or four tertiary amino moieties.

5. The hydrophilic monomer according to claim 1, wherein the monomer comprises acrylate moieties in an amount of from 1 to 10.

6. The hydrophilic monomer according to claim 1, wherein the monomer is a monomer according to any one of formulae (I), (II), (III), (IV), (V), (VI), (VII), or (VIII)

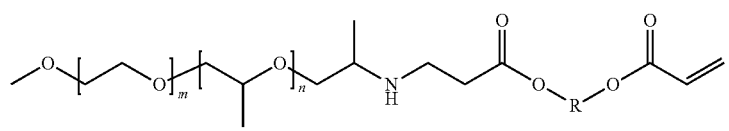

Formula (I)

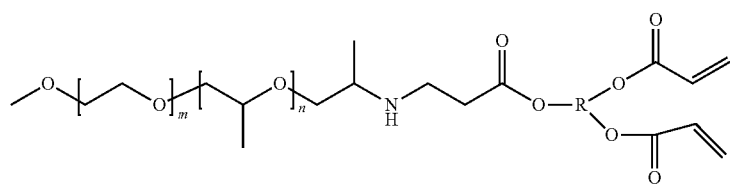

Formula (II)

-continued
Formula (III)
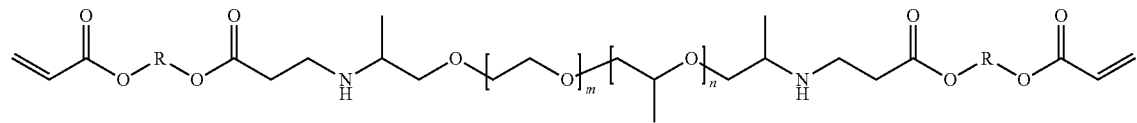
Formula (IV)
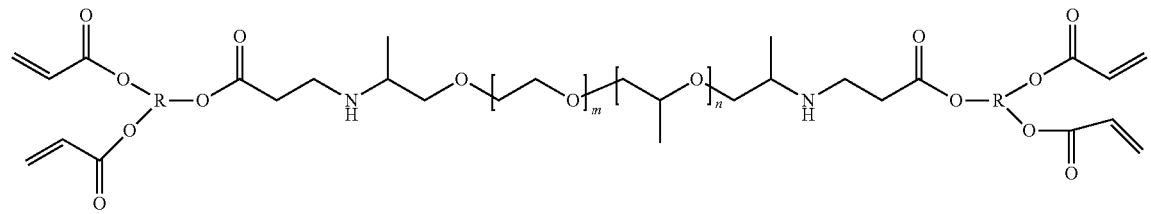
Formula (V)
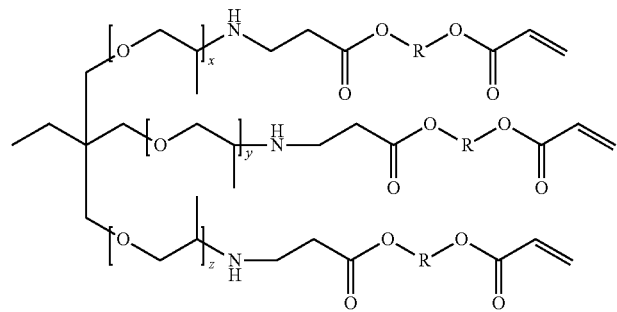
Formula (VI)
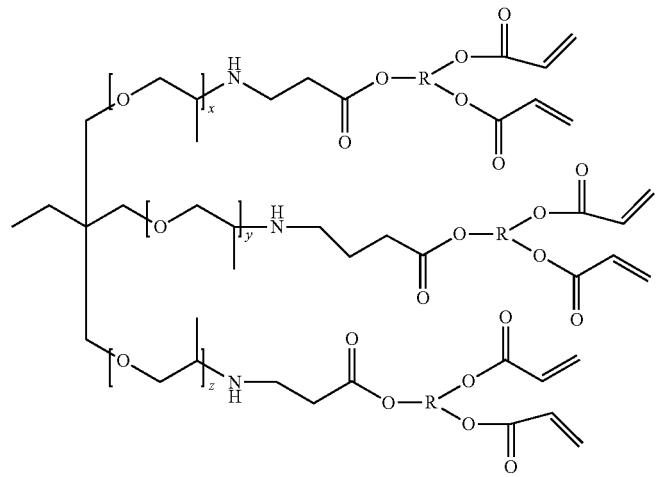
Formula (VII)
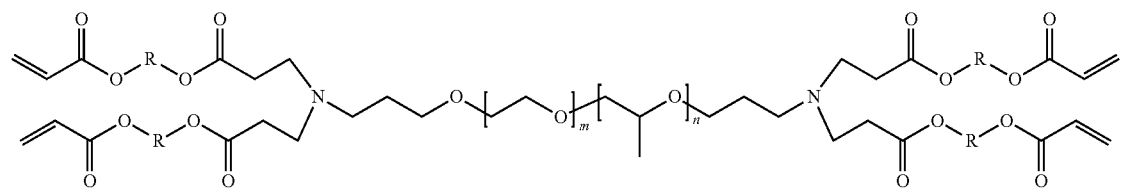

Formula (VIII)
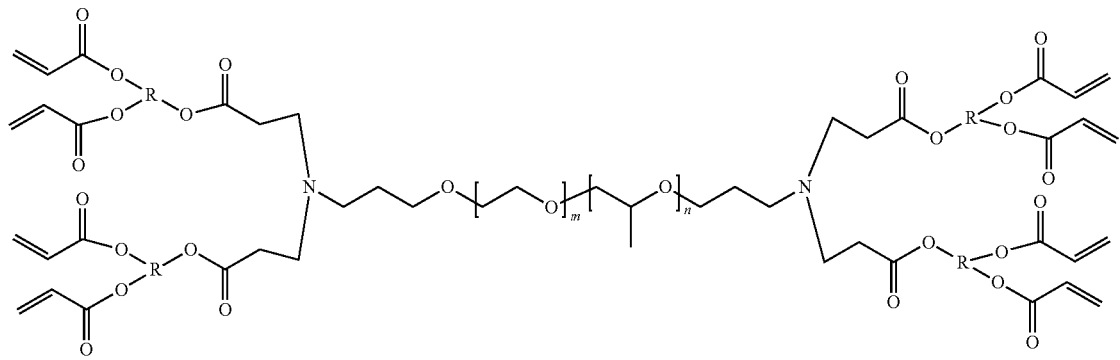
wherein R is a linear or branched alkyl or alkoxy,
wherein m an n may be different or the same,
wherein m and n may each be in a range of from 1 to 100.
7. The hydrophilic monomer according to claim 1, wherein the monomer is a monomer according to any one of formulae (IX to XIV) (XI to XIV)
Formula (XI)
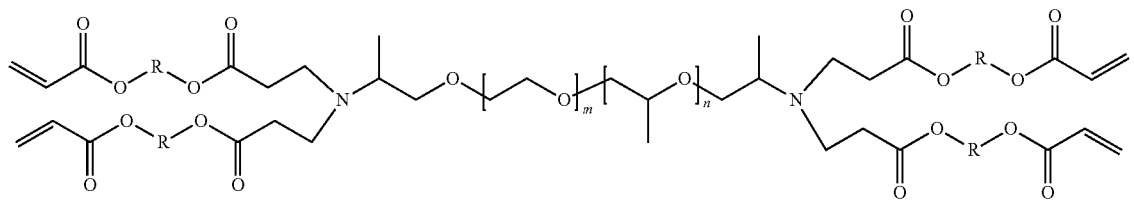
Formula (XII)
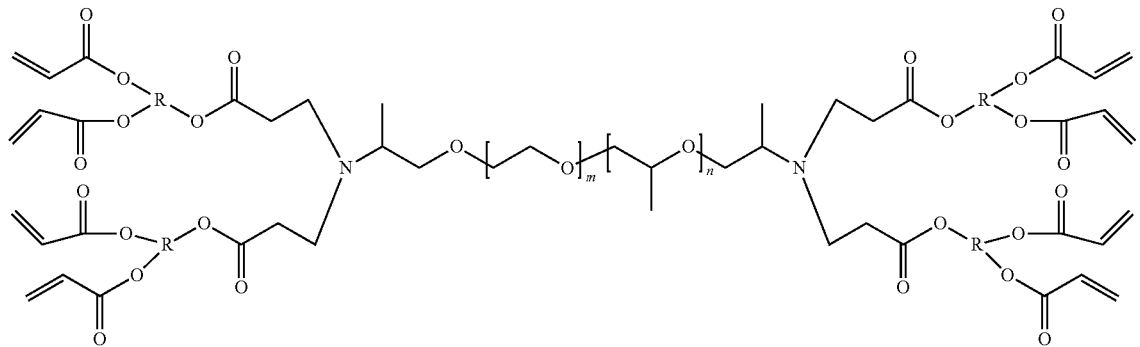

Formula (XIII)

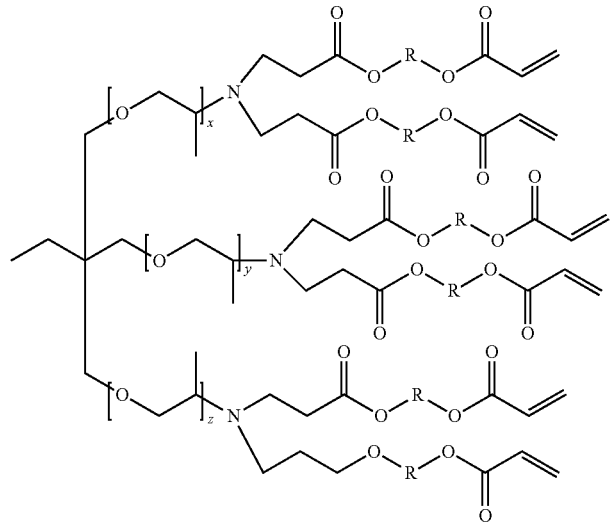

Formula (XIV)

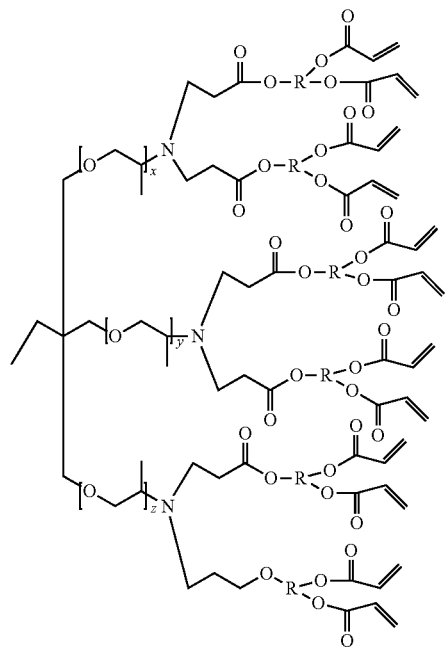

wherein R is a linear or branched alkyl or alkoxy,
wherein m an n may be different or the same,
wherein m and n may each be in a range of from 1 to 100;
wherein x, y, z may be different or the same,
wherein x, y, z may be each in a range of from 1 to 100.

8. The hydrophilic monomer according to claim 1, obtained from reacting at least one polyoxyalkylamine with at least one acrylate compound.

9. The hydrophilic monomer according to claim 8, wherein the polyoxyalkylmine is a polyetherdiamine comprising ethoxy-units and propyloxy-units.

10. The hydrophilic monomer according to claim 9, wherein the ratio of ethoxy-units to propyloxy-units EO:PO is in the range of from 1 to 20.

11. A process for producing a hydrophilic monomer, comprising reacting at least one polyoxyalkylamine with at least one acrylate compound; wherein the hydrophilic monomer comprises (i) at least one amino moiety; (ii) at least one polyoxyalkyene unit; and (iii) at least one acrylate moiety, wherein the at least one amino moiety isa at least one secondary amino moiety and/or at least two tertiary amino moieties.

12. The process according to claim 11, wherein the at least one polyoxyalkylamine is selected from polyetheramines.

13. The process according to claim 11, wherein the polyoxyalkylamine exhibits a molecular weight in the range of from 80 g/mol to 8000 g/mol.

14. Coating obtained from the hydrophilic monomer according to claim 1 by coating hydrophilic monomer onto a substrate and curing the coating by actinic irradiation.

15. The hydrophilic monomer according to claim 1, wherein the at least one acrylate compound is selected from alkyldiacrylates, alkyltriacrylates, alkyltetraacrylates, alkylpentaacrylates, alkyl hexaacrylates, polyethylene glycol diacrylates, ethoxylated trimethylolpropane triacrylates, and trimethylolpropane triacrylate.

* * * * *